United States Patent
Vasavan et al.

(10) Patent No.: US 11,550,707 B2
(45) Date of Patent: Jan. 10, 2023

(54) SYSTEMS AND METHODS FOR GENERATING AND EXECUTING A TEST CASE PLAN FOR A SOFTWARE PRODUCT

(71) Applicant: Verizon Patent and Licensing Inc., Basking Ridge, NJ (US)

(72) Inventors: Karmegam Vasavan, Chennai (IN); Kirupa Rajkumar, Chennai (IN); Suresh Subburayalu, Chennai (IN); Vijay M. Yeturi, Cary, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/302,372

(22) Filed: Apr. 30, 2021

(65) Prior Publication Data

US 2022/0350733 A1    Nov. 3, 2022

(51) Int. Cl.
*G06F 11/36* (2006.01)
*G06F 9/54* (2006.01)

(52) U.S. Cl.
CPC .......... *G06F 11/3692* (2013.01); *G06F 9/541* (2013.01); *G06F 11/3664* (2013.01); *G06F 11/3684* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 11,347,631 B1* | 5/2022 | Merritt | G06N 5/003 |
| 2019/0089577 A1* | 3/2019 | Misra | G06F 16/9024 |
| 2019/0163618 A1* | 5/2019 | Akiona | G06Q 10/06 |
| 2019/0171552 A1* | 6/2019 | Mitchell | G06F 11/3684 |
| 2020/0349055 A1* | 11/2020 | Reddy | G06F 11/3692 |
| 2021/0263842 A1* | 8/2021 | Sekhar | G06F 11/3684 |
| 2021/0287177 A1* | 9/2021 | Musialek | G06Q 10/06312 |
| 2021/0374040 A1* | 12/2021 | Kumar | G06F 11/3684 |
| 2022/0091968 A1* | 3/2022 | Kumar | G06N 20/00 |

OTHER PUBLICATIONS

Zhang, "Machine Learning in Value-Based Software Test Data Generation", 2006, IEEE (Year: 2006).*

* cited by examiner

*Primary Examiner* — Hossain M Morshed

(57) ABSTRACT

A device may receive a selection of a software product and test input data identifying inputs of a test case for the software product. The device may receive the software product based on the selection of the software product and may generate test data for the test case based on the test input data and the software product. The device may process the test data and the software product, with a machine learning model, to generate a test case plan that includes the test data and test steps and may generate test scripts for the test case plan based on the software product. The device may automatically cause the software product to execute the test scripts to generate test results and may perform one or more actions based on the test results.

20 Claims, 10 Drawing Sheets

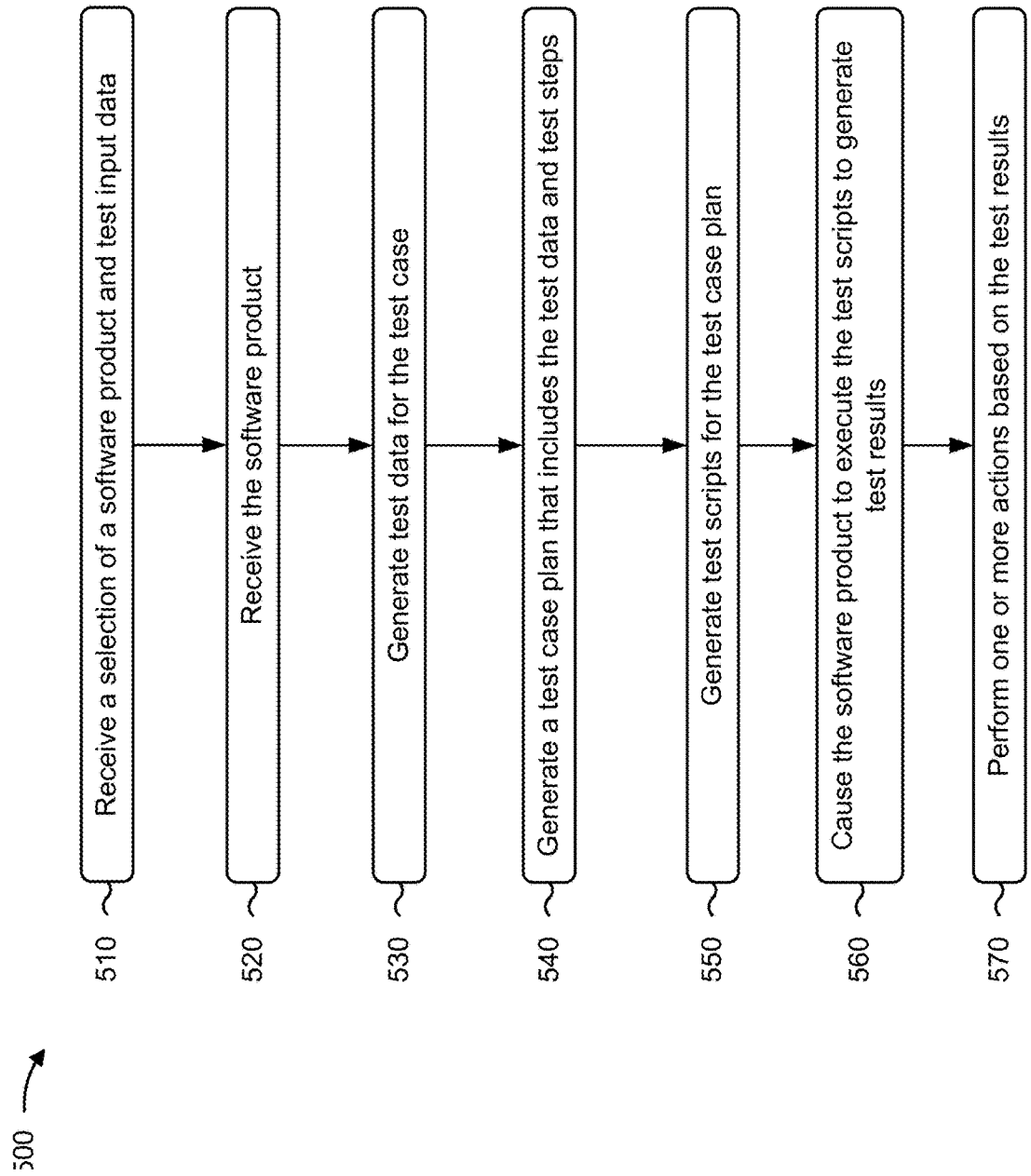

SYSTEMS AND METHODS FOR GENERATING AND EXECUTING A TEST CASE PLAN FOR A SOFTWARE PRODUCT

BACKGROUND

Software testing is utilized to determine information about a quality of a software product under test. Software testing techniques include executing a software product to identify errors in the software product and to verify that the software product operates as intended.

BRIEF DESCRIPTION OF THE DRAWINGS

FIG. 5 is a flowchart of an example process relating to generating and executing a test case plan for a software product.

DETAILED DESCRIPTION OF PREFERRED EMBODIMENTS

Figure 1A:
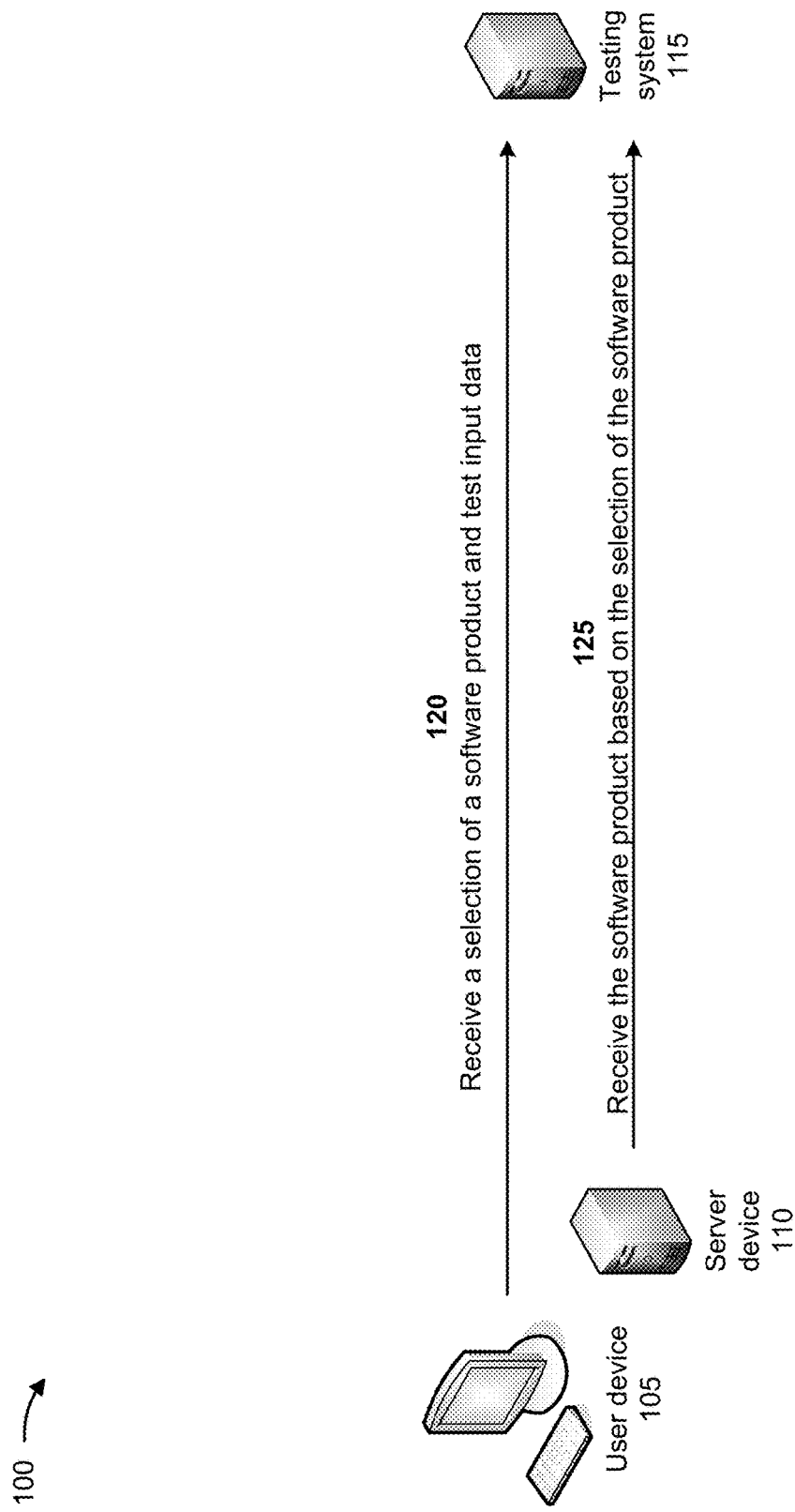
FIGS. 1A-1F are diagrams of an example associated with generating and executing a test case plan for a software product.

The following detailed description of example implementations refers to the accompanying drawings. The same reference numbers in different drawings may identify the same or similar elements.

Software testing involves execution of a software product or a component of a software product to evaluate one or more properties of the software product. The properties may indicate an extent to which the software product meets design and development requirements associated with the software product, responds correctly to inputs, performs functions within an acceptable amount of time, can be installed and executed in intended environments, achieves particular results, and/or the like. However, current software testing techniques require technical knowledge of the software product being tested. Commonly, a person (or a group of people) performing the test is different from a person (or a group of people) who developed the software product. Because the person performing the test of the software product is different from the person who developed the software product, the person performing the test may fail to possess the technical knowledge required by current software testing techniques. Failing to possess the required technical knowledge may cause the person performing the test to generate incorrect software tests based on incorrect technical knowledge of the software product, reperform the incorrect software tests, handle incorrect test results based on execution of the incorrect software tests, misinterpret a result of a software test, incorrectly identify a cause of error indicated by a software test, and/or the like.

Some implementations described herein provide a testing system that automatically generates and executes a test case plan for a software product. The test case plan may include test data and a series of steps to be performed based on the test data by the software product. For example, the testing system may receive a selection of a software product and test input data identifying inputs of a test case for the software product. The testing system may receive the software product based on the selection of the software product and may generate test data for the test case based on the test input data and the software product. The testing system may process the test data and the software product, with a machine learning model, to generate a test case plan that includes the test data and test steps and may generate test scripts for the test case plan based on the software product. The testing system may automatically cause the software product to execute the test scripts to generate test results and may perform one or more actions based on the test results.

In this way, the testing system automatically generates and executes a test case plan for a software product. The testing system may enable a tester (e.g., a person or persons conducting a test of the software product) without technical knowledge of the software product to automatically generate tests for the software product. The testing system addresses gaps in the current software testing techniques by automatically analyzing the software product, generating a test case with detailed test steps based on analyzing the software product, generating test data (e.g., customer data, product data, encrypted data, and/or the like) and test scripts for the test case, and causing the software product to execute the test scripts to generate test results. Thus, the testing system conserves computing resources, networking resources, human resources, and/or the like associated with attempting to locate the technical description of the software product, attempting to gain the technical knowledge of the software product, generating incorrect software tests based on incorrect technical knowledge of the software product, reperforming the incorrect software tests, handling incorrect test results based on execution of the incorrect software tests, and/or the like.

FIGS. 1A-1F are diagrams of an example 100 associated with generating and executing a test case plan for a software product. As shown in FIGS. 1A-1F, example 100 includes a user device 105, a server device 110, and a testing system 115. Further details of the user device 105, the server device 110, and the testing system 115 are provided below.

As shown in FIG. 1A, and by reference number 120, the testing system 115 receives selection of a software product and test input data from a user device 105. The selection of the software product may include information identifying a software product to be tested. The test input data may identify inputs of a test case for the software product. For example, the test input data may include information identifying a functionality of the software product, a set of parameters under which the functionality is to be tested, and/or the like.

In some implementations, the testing system 115 provides a chat interface to the user device 105. The testing system 115 may conduct a chat with a user of the user device 105 via the chat interface. The testing system 115 may receive the selection of the software product and/or the test input data based on conducting the chat with the user of the user device 105. For example, the user may input, via the chat interface, information identifying the software product and/or the test input data, information identifying a memory location at which the software application and/or the test input data is stored, and/or the like.

In some implementations, the testing system 115 analyzes the input information to determine a set of queries associated with testing the software product. The set of queries may be provided to the user (e.g., via the chat interface) to request additional test input data from the user. As an example, a user may input, via the chat interface, information identifying a software product to be tested and test input data indicating that software product is to communicate with a device via a network. The testing system 115 may analyze the input information and may provide a set of queries to the user requesting information associated with a type of the network (e.g., a wired network, a wireless network, a local area network, and/or the like), a communication protocol to be utilized to communicate with the device, a location of the device, a location of the software product, a bandwidth of a communication link, and/or the like.

In some implementations, the testing system 115 utilizes one or more natural language processing (NLP) techniques to analyze the information input via the chat interface. In some implementations, the testing system 115 performs preprocessing based on an NLP technique. For example, the testing system 115 may convert text to lowercase, remove punctuation, remove stop words, strip white space, perform stemming, perform lemmatization, spell out abbreviations and acronyms, and/or the like. In some implementations, the testing system 115 removes sparse words, such as words that are uncommon (e.g., according to a domain-specific corpus, and/or the like). Performing the preprocessing for the NLP technique may improve accuracy of the NLP technique and may conserve computing resources that would otherwise be used to perform the NLP technique in a less efficient fashion for an un-preprocessed data set.

In some implementations, testing system 115 executes a first NLP technique for analyzing unstructured documents. For example, the testing system 115 may analyze unstructured text input via the chat interface (e.g., information identifying a software product and/or test input data) using a token-based NLP technique (e.g., a technique using regular expressions), a category-based NLP technique (e.g., a named entity recognition (NER) technique), an approximation-based NLP technique (e.g., a fuzzy text search technique), and/or the like. Additionally, or alternatively, the testing system 115 may analyze structured test input data using a second NLP technique (e.g., a metadata-based NLP technique and/or a similar type of technique).

In some implementations, the testing system 115 executes a token-based NLP technique, such as a technique using regular expressions, to identify the test input data. For example, the testing system 115 may reference a data structure that stores regular expressions that may be used to identify a software product to be tested and/or test input data associated with the software product. The testing system 115 may use the regular expressions to identify the test input data based on comparing the regular expressions and information input by the user via the chat interface.

Additionally, or alternatively, the testing system 115 may execute an approximation-based NLP technique, such as a fuzzy text search technique, to identify the software product to be tested and/or the test data associated with the software product. For example, the testing system 115 may execute an approximation-based NLP technique to identify text input via the chat interface that satisfies a threshold level of similarity with data stored in a data structure. In this case, the testing system 115 may set a threshold level of similarity (e.g., a percentage, a number of characters, and/or the like), and may compare information input via the chat interface to information stored in the data structure. If the testing system 115 determines that the threshold level of similarity is satisfied, the testing system 115 may identify the information stored in the data structure as the software product to be tested and/or as test input data associated with the software product.

In some implementations, the testing system 115 uses multiple NLP techniques, and filters outputs of the multiple NLP techniques into a set of values identifying the software product to be tested and/or the test input data associated with the software product. For example, the testing system 115 may identify a first set of values using a first one or more NLP techniques. Additionally, the testing system 115 may identify a second set of values using a second one or more NLP techniques. In some implementations, a mixture of overlapping values and conflicting values may occur. In these implementations, the testing system 115 may address the conflicting values by filtering the first set of values and the second set of values into a third set of values that excludes duplicate values, excludes conflicting values (e.g., by selecting one value, of two conflicting values, using a rule, such as a threshold) and/or the like. The testing system 115 may use the third set of values as the set of values identifying the software product to be tested and/or the test input data associated with the software product.

Additionally, or alternatively, the testing system 115 may take an average, or a weighted average, of the outputs of the one or more NLP techniques being deployed to identify the software product to be tested and/or the test input data associated with the software product. As an example, the testing system 115 may assign a weight to an output associated with each additional NLP technique and may take an average or a weighted average to identify the software product to be tested and/or the test input data associated with the software product.

As shown by reference number 125, the testing system 115 receives, from the server device 110, the software product based on the selection of the software product. For example, the testing system 115 may identify the software product based on the information input by the user via the chat interface, as described above. The testing system 115 may determine a location at which the software product is stored. For example, the testing system 115 may determine the location at which the software product is stored based on accessing a data structure (e.g., a database, a table, a list, and/or the like) storing information associated with software products with information identifying a memory location of a memory of the server device 110 at which the software product is stored (e.g., a memory address, a network address, and/or the like). The testing system 115 may utilize the information stored in the data structure to obtain the software product.

Figure 1B:
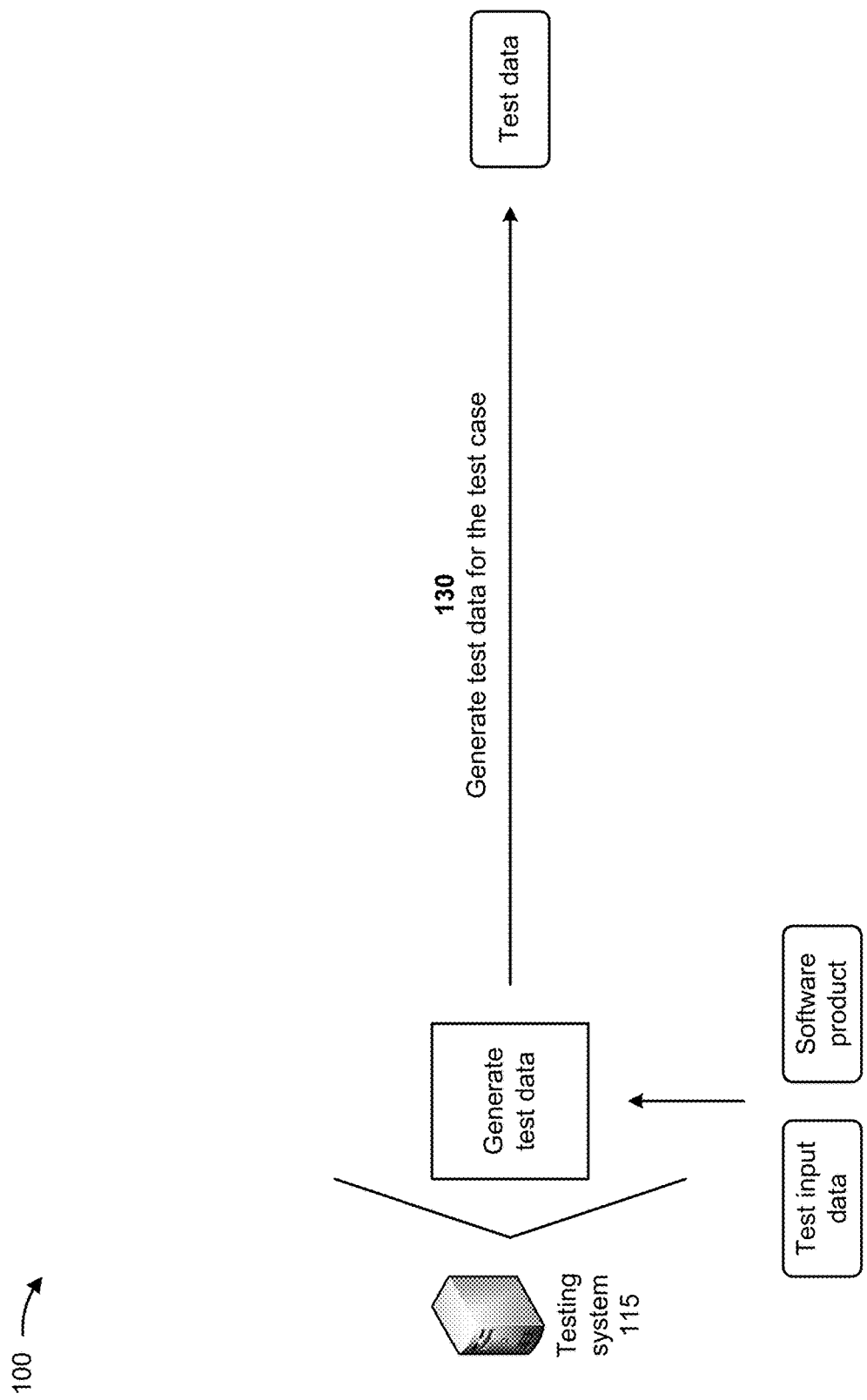

As shown in FIG. 1B, and by reference number 130, the testing system 115 generates test data for the test case. The testing system 115 may generate the test data for the test case based on the test input data and the software product. In some implementations, the testing system 115 determines a test case flow associated with testing the software product and generates the test case data based on the test case flow. The test case flow may include a series of processes to be performed by the software product to test a particular functionality of the software product. As an example, the software product may be associated with a retail website and the test input data may indicate that a product purchase functionality of the software product is to be tested. The testing system 115 may generate a test case flow associated with the product purchase functionality that includes a process associated with a user viewing a product via the retail website, a process associated with receiving an input indicating that the user wants to purchase the product, a process associated with the user purchasing the product, a process associated with providing the product to the user, and/or the like.

In some implementations, the testing system 115 obtains a test case flow associated with testing the software product from the server device 110. The server device 110 may include a repository of test case flows associated with different types of software products (e.g., a software product associated with purchasing a product online, an accounting software product, an inventory software product, and/or the like) and/or different types of functionalities of software product (e.g., a purchase functionality, a search functionality, and/or the like).

The testing system 115 may obtain one or more test case flows based on a type of the software product to be tested and/or a functionality of the software product. In some implementations, the testing system 115 determines the type of the software product and/or the functionality of the software product based on the test input data. For example, the testing system 115 may cause a chat window to be provided to the user requesting the user to input a type of the software product and/or a functionality of the software product to be tested. Alternatively, and/or additionally, the testing system 115 may analyze one or more portions of the software product and may determine the type of the software product and/or the functionality of the software product based on the analysis. The testing system 115 may provide a request to the server device 110 and may receive one or more test case flows associated with the type of the software product and/or the functionality of the software product based on the request.

In some implementations, the testing system 115 generates the test case flow based on analyzing software code associated with the software product. The testing system 115 may determine a series of processes associated with a function to be tested based on analyzing the software code and may generate the test case flow based on the series of processes.

Alternatively, and/or additionally, the testing system 115 may obtain the test case flow based on accessing a data structure storing test case flows associated with software products and/or functionalities of software products. In some implementations, the testing system 115 may determine the test case flow based on user input. For example, the testing system 115 may obtain a test case flow from the data structure and may provide the test case flow for display to the user (e.g., via the chat interface). The user may review the test case flow and may input information modifying a process included in the test case flow, remove a process from the test case flow, add a process to the test case flow, change an order in which the processes are performed, and/or the like.

The testing system 115 may generate the test data based on the series of processes included in the test case flow. For example, the testing system 115 may analyze the series of processes to determine input data required by the software program to perform the series of processes (e.g., customer data, product data, payment data, shipping data, inventory data, and/or the like) and may generate test data corresponding to the determined input data. Alternatively, and/or additionally, the testing system 115 may receive the test data from another device.

In some implementations, the testing system 115 receives the test data for the test case from another device. The testing system 115 may provide the software product, the test input data, and/or the test case flow to an application programming interface (API) development platform. In some implementations, the API development platform includes an enterprise data gathering engine (EDGE) configured to generate, store, and/or retrieve test data. The API development platform may analyze the software product, the test input data, and/or the test case flow and may generate the test data based on the analysis. The API development platform may provide the generated test data to the testing system 115.

Figure 1C:
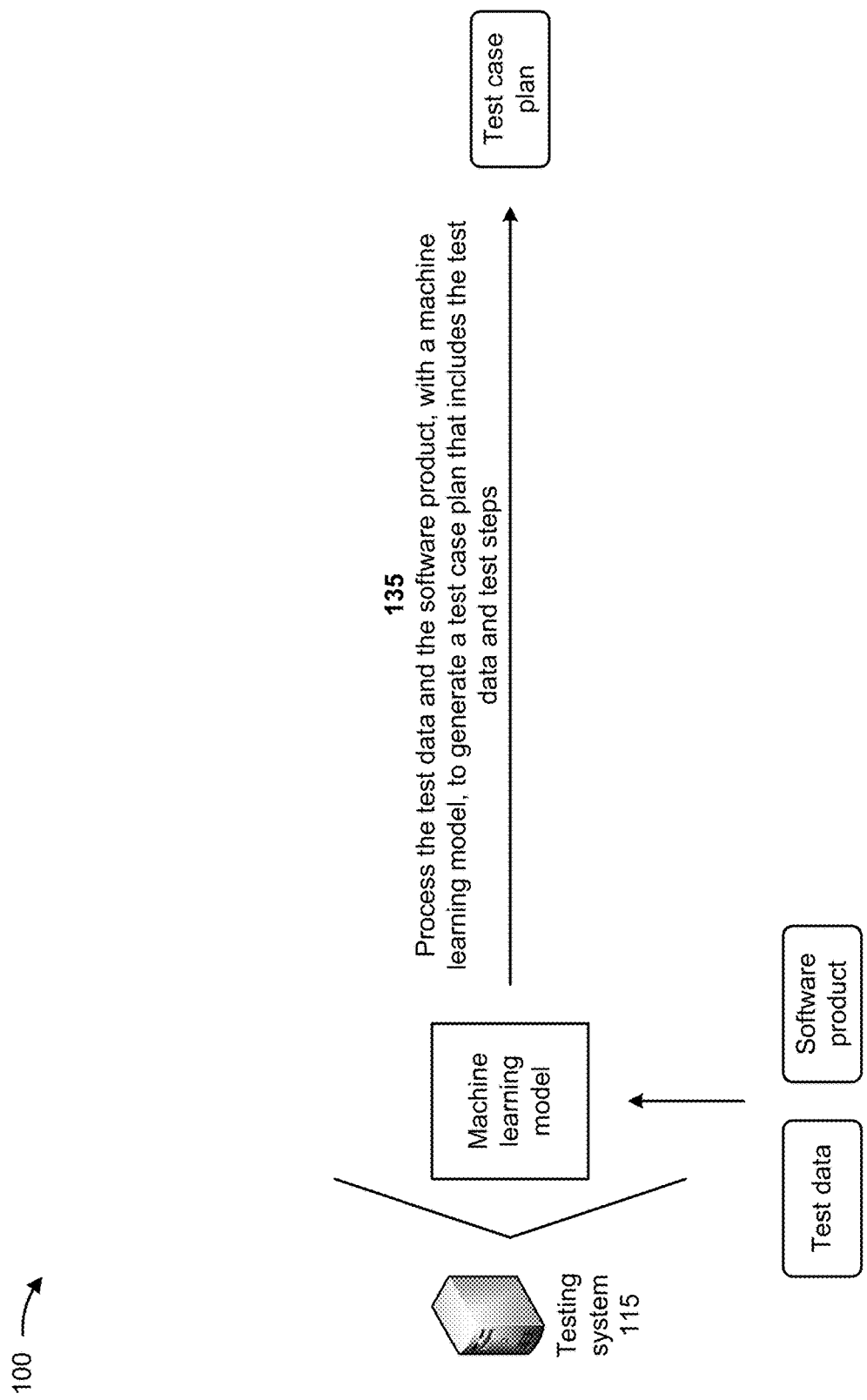

As shown in FIG. 1C, and by reference number 135, the testing system 115 processes the test data and the software product, with a machine learning model, to generate a test case plan that includes the test data and the test steps. In some implementations, the machine learning model includes a test case model associated with a test management tool.

The test case plan may identify one or more iterations of test steps to be performed to test the software product. An iteration of test steps may test a functionality of the software product under a particular set of conditions associated with particular portions of the test data. The test case plan may include information identifying portions of the test data associated with each test step included in a particular iteration of test steps.

A test step may include information identifying one or more actions to be performed to test a functionality of the software product. For example, a test step may include information indicating that the software product is to receive a particular user input, that the software product is to query a data structure to obtain information associated with a user input, that the software product is to provide information associated with a user input for display, and/or the like.

In some implementations, the testing system 115 trains the machine learning model to generate the test case plan. The machine learning model may be trained based on historical data relating to test case plans utilized to test software products. The machine learning model may be trained to determine, based on information regarding a software product and test data, a test case plan associated with testing the software product and a confidence score that reflects a measure of confidence that the test case plan is accurately generated for the software product. In some implementations, the testing system 115 trains the machine learning model in a manner similar to that described below with respect to FIG. 2. Alternatively, and/or additionally, the testing system 115 may obtain a trained machine learning model from another device.

Figure 1D:
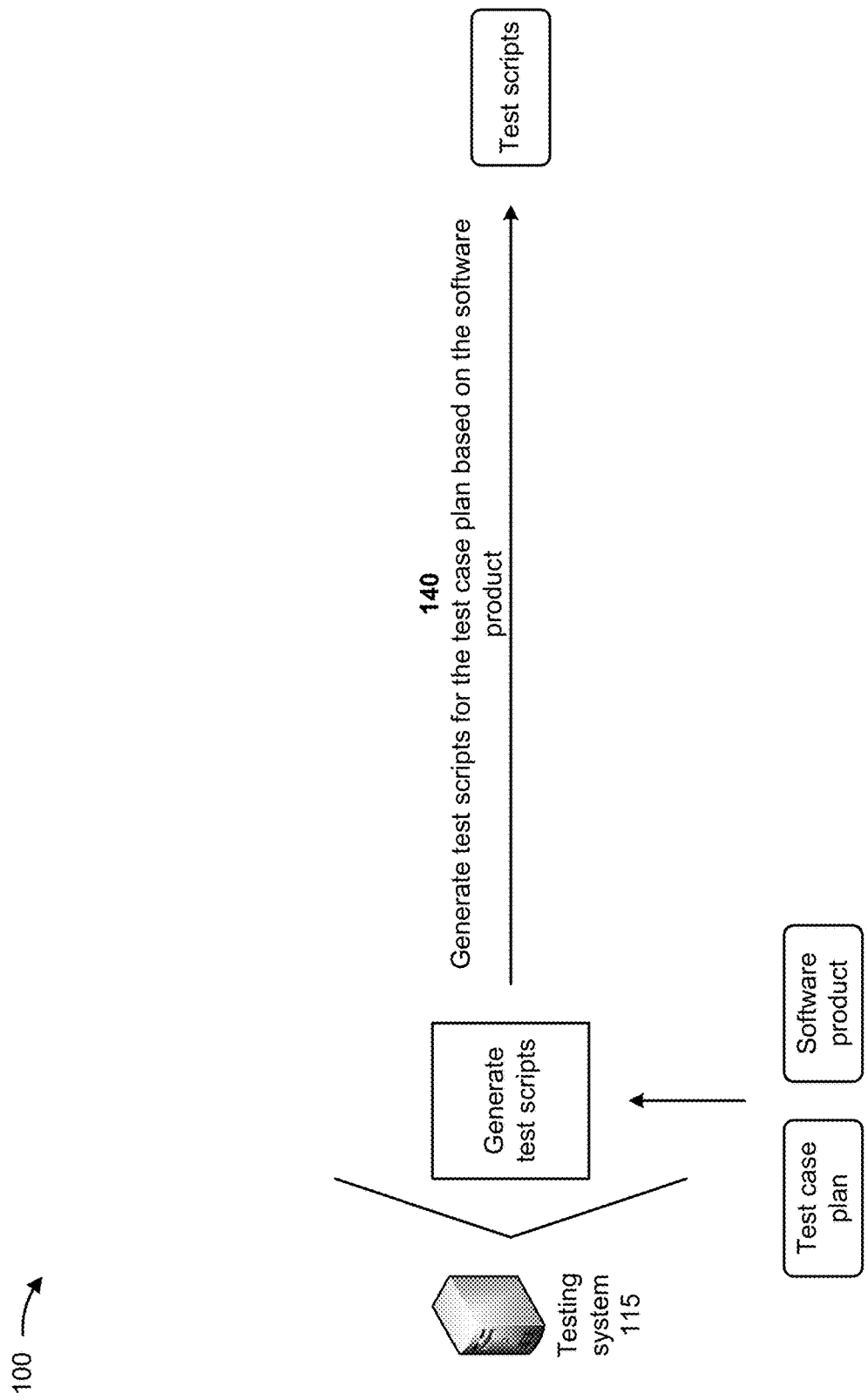

As shown in FIG. 1D, and by reference number 140, the testing system 115 generates test scripts for the test case plan based on the software product. Each test script may be associated with performing one or more test steps included in the test case plan. For example, a test script may include an executable script that can be executed to cause the software product to perform a particular function corresponding to a particular test step of the test case plan.

In some implementations, the testing system 115 generates the test scripts to be executable by an end-to-end testing framework. The end-to-end testing framework may be configured to test the software product from a start to an end of the test case plan to simulate a real-world scenario and/or to test components of the software product for integration and data integrity.

Alternatively, and/or additionally, the testing system 115 may generate the test scripts to be executable by a behavior-driven development testing framework. The behavior-driven development testing framework may generate the test case based on human-readable descriptions of software product requirements for the software product. The testing system 115 may utilize the behavior-driven development testing framework to translate the test input data, the test data, and/or the test case plan into the test scripts. In this way, the testing system 115 may enable a tester (e.g., a user) without technical knowledge of the software product to automatically generate tests for the software product.

In some implementations, the testing system 115 generates the test scripts for the test case plan based on providing the test case plan to the user. For example, the testing system 115 may provide the test case plan for display to a user device associated with a user. The user may review the test case plan and may input information indicating approval of the test case plan. The testing system 115 may receive, from the user device, the information indicating approval of the test case plan. The testing system 115 may generate the test scripts for the test case plan based on receiving the information indicating approval of the test case plan.

Figure 1E:
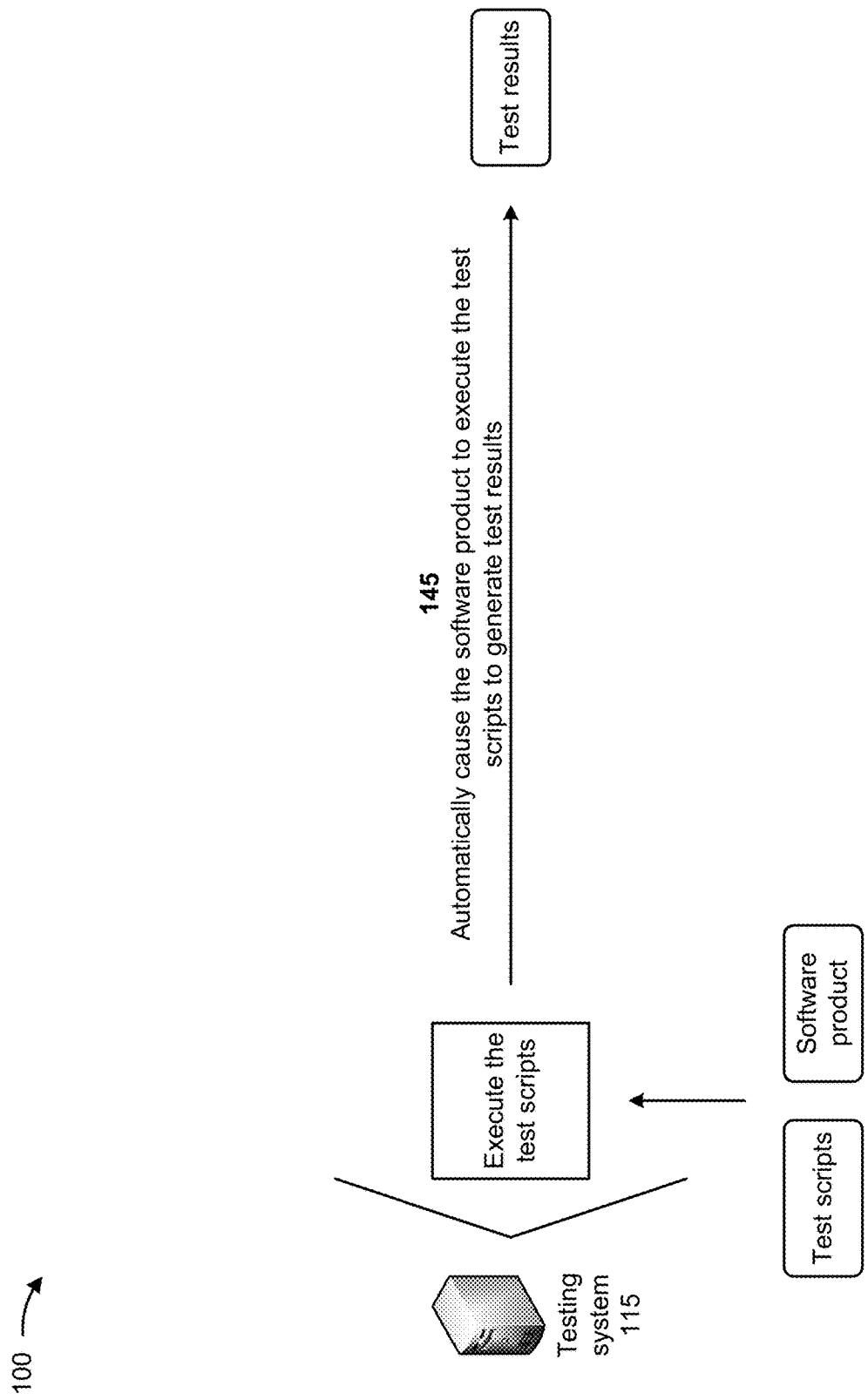

As shown in FIG. 1E, and by reference number 145, the testing system 115 automatically causes the software product to execute the test scripts to generate test results. In some implementations, the testing system 115 causes the software product to execute the test scripts, via the end-to-end testing framework and/or the behavior-driven development testing framework, to generate the test results. The testing system 115 may cause the software product to execute the test scripts locally and/or remotely to generate the test results.

Figure 1F:
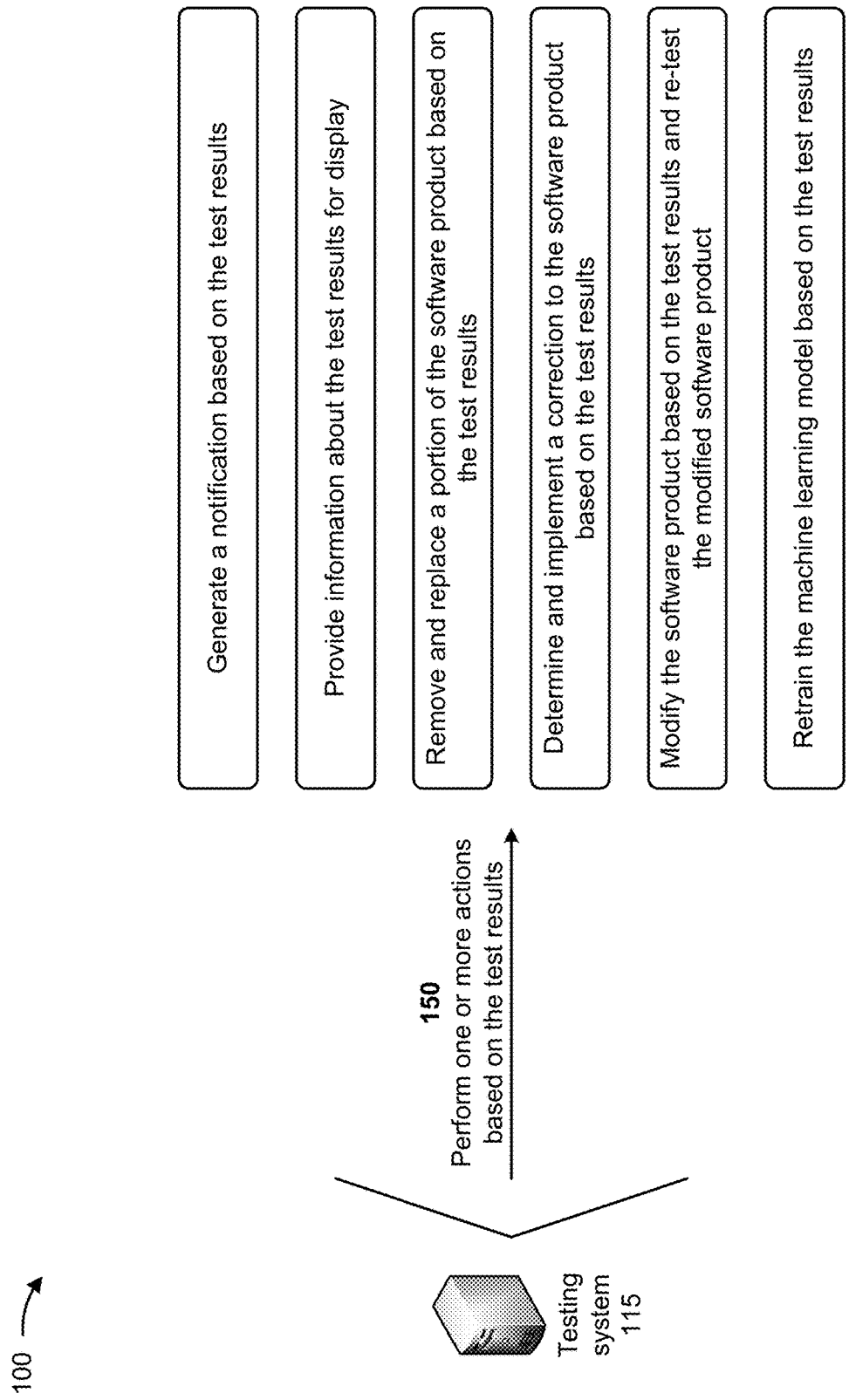

As shown in FIG. 1F, and by reference number 150, the testing system 115 performs one or more actions based on the test results. In some implementations, the one or more actions include the testing system 115 generating a notification based on the test results and/or providing information about the test results for display. For example, the testing system 115 may generate a notification indicating that the test results have been generated, a result indicated by the test results, and/or the like. The testing system 115 may provide the notification to a user device to cause the user device to provide the notification for display.

In some implementations, the one or more actions include the testing system 115 determining and/or implementing a correction to the software product based on the test results. For example, the test results may indicate that the software product failed to perform a function associated with a particular test step. The testing system 115 may identify a portion of the software product associated with performing the function and, as shown in FIG. 1F, may remove a portion of the software product, may generate a new portion for the software product, may replace the portion of the software product with the new portion for the software product, may modify the portion of the software product, and/or the like.

In some implementations, the one or more actions include the testing system 115 retesting the software product. The testing system 115 may identify a correction to be made to the software product based on the test results and may implement the correction to the software product. The testing system 115 may re-test the software product based on implementing the correction.

In some implementations, the one or more actions include the testing system 115 retraining the machine learning model based on the test results. The testing system 115 may utilize the test input data, the test case flows, the test case plan, the test data, and/or the test results as additional training data for retraining the machine learning model, thereby increasing the quantity of training data available for training the machine learning model. Accordingly, the testing system 115 may conserve computing resources associated with identifying, obtaining, and/or generating historical data for training the machine learning model relative to other systems for identifying, obtaining, and/or generating historical data for training machine learning models.

As described above, the testing system 115 automatically generates and executes a test case plan for a software product. The testing system 115 may enable a tester without technical knowledge of the software product to automatically generate tests for the software product. The testing system 115 addresses gaps in the current software testing techniques by automatically analyzing the software product, generating a test case with detailed test steps based on analyzing the software product, generating test data (e.g., customer data, product data, encrypted data, and/or the like) and test scripts for the test case, and causing the software product to execute the test scripts to generate test results. Thus, the testing system 115 conserves computing resources, networking resources, human resources, and/or the like associated with attempting to locate the technical knowledge of the software product, generating incorrect software tests based on incorrect technical knowledge of the software product, reperforming the incorrect software tests, handling incorrect test results based on execution of the incorrect software tests, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
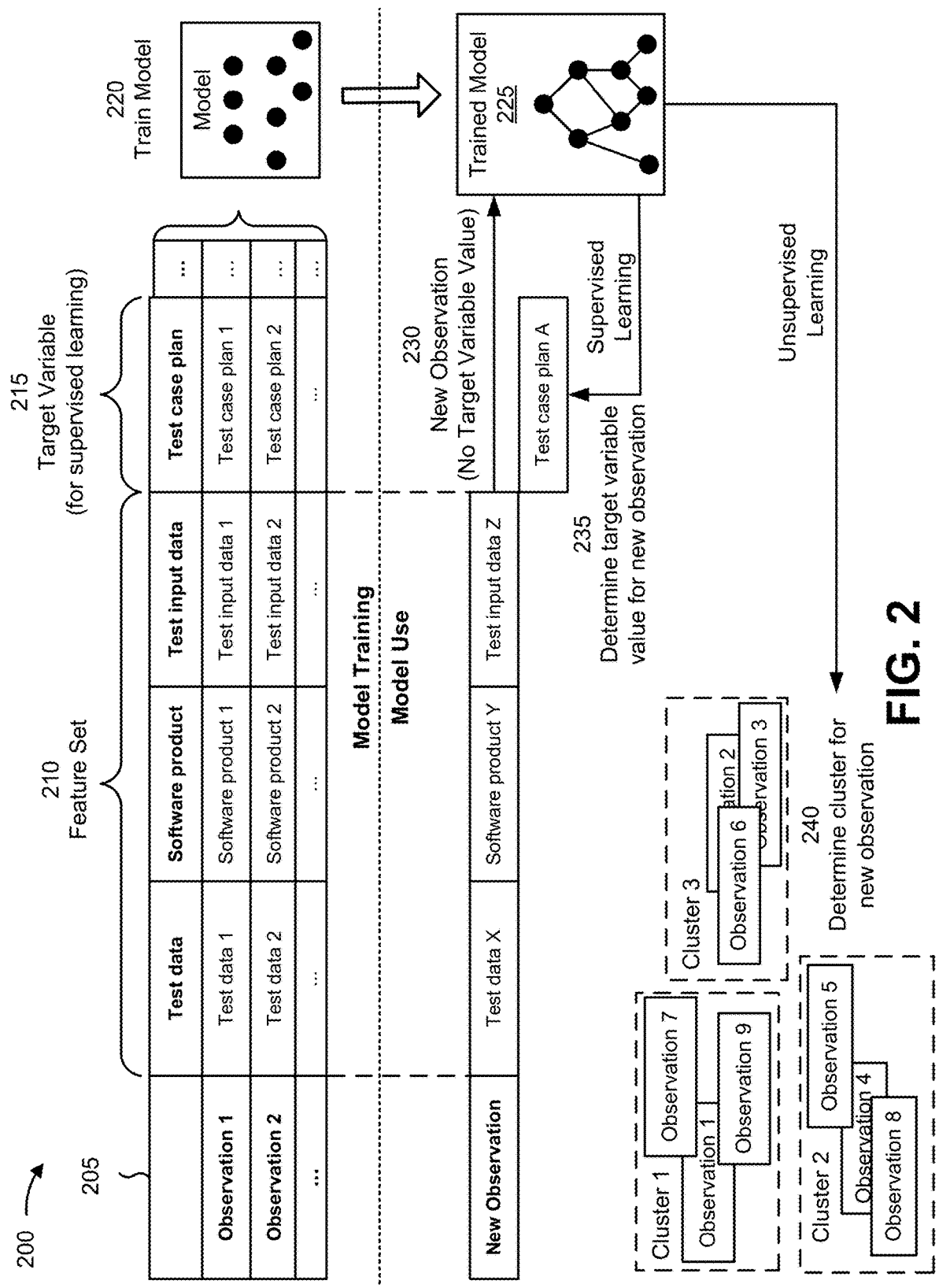
FIG. 2 is a diagram illustrating an example of training and using a machine learning model in connection with generating and executing a test case plan for a software product.

FIG. 2 is a diagram illustrating an example 200 of training and using a machine learning model in connection with generating and executing a test case plan for a software product. The machine learning model training and usage described herein may be performed using a machine learning system. The machine learning system may include or may be included in a computing device, a server, a cloud computing environment, or the like, such as the testing system 115 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the user device 105, the server device 110, and/or the testing system 115, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device 105, the server device 110, and/or the testing system 115. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of test data, a second feature of a software product, a third feature of test input data, and so on. As shown, for a first observation, the first feature may have a value of test data 1, the second feature may have a value of software product 1, the third feature may have a value of test input data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a test case plan, which has a value of test case plan 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of test data X, a second feature of software product Y, a third feature of test input data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of test case plan A for the target variable of test case plan for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, execute test case plan A for the software product. The first automated action may include, for example, executing test case plan A for the software product.

As another example, if the machine learning system were to predict a value of test case plan B for the target variable of test case plan, then the machine learning system may provide a second (e.g., different) recommendation (e.g., execute test case plan B for the software product) and/or may perform or cause performance of a second (e.g., different) automated action (e.g., executing test case plan B for the software product).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a test data cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a software product cluster), then the machine learning system may provide a second (e.g., different) recommendation, such as the second recommendation described above and/or may perform or cause performance of a second automated action, such as the second automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to generate and execute a test case plan for a software product. The machine learning system enables recognition and/or identification of tens, hundreds, thousands, or millions of features and/or feature values for tens, hundreds, thousands, or millions of observations, thereby increasing accuracy and consistency and reducing delay associated with generating and executing a test case plan for a software product relative to requiring computing resources to be allocated for tens, hundreds, or thousands of operators to manually generate and execute a test case plan for a software product.

As indicated above, FIG. 2 is provided as an example. Other examples may differ from what is described in connection with FIG. 2.

Figure 3:
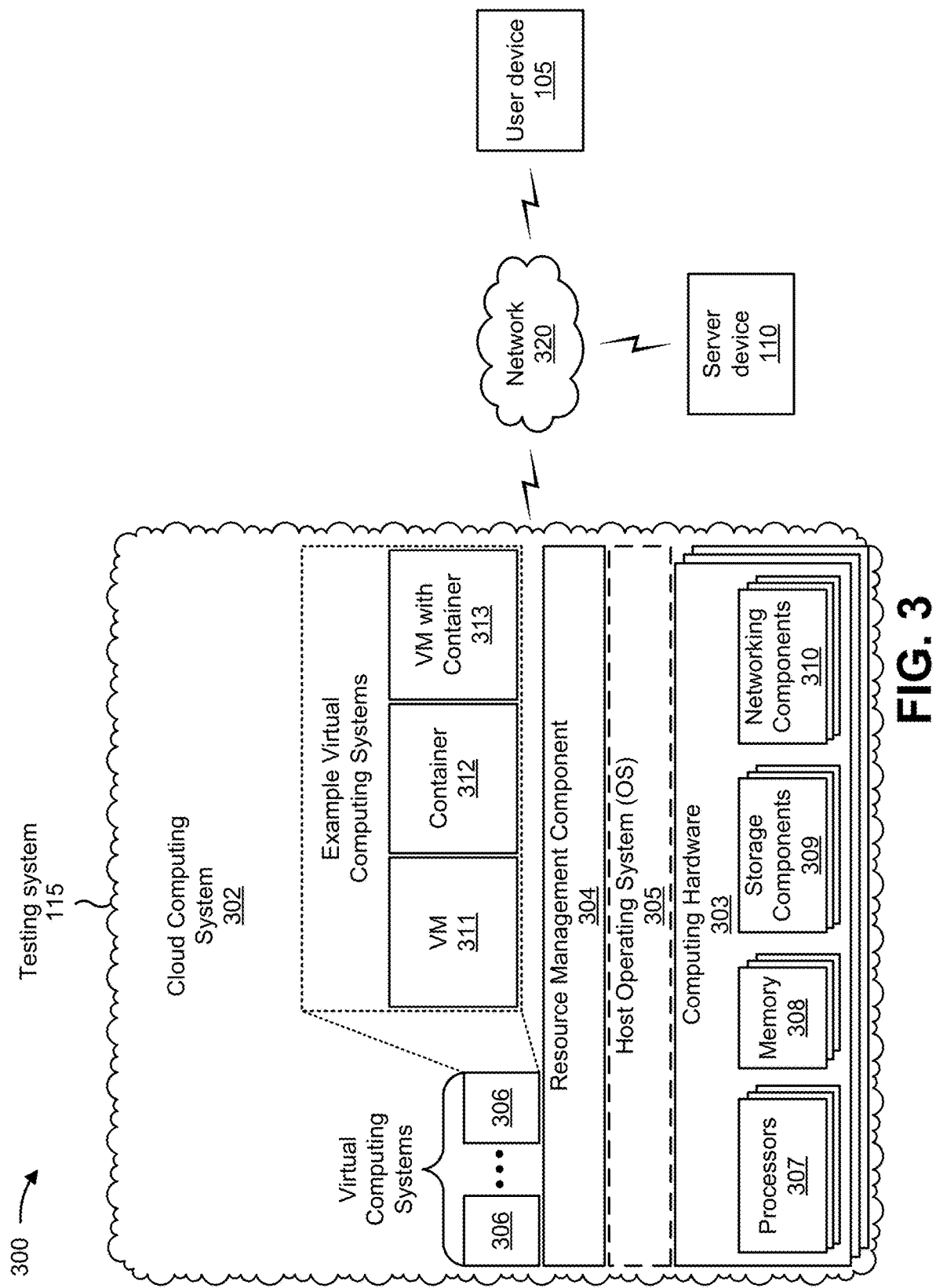
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a testing system 115, which may include one or more elements of and/or may execute within a cloud computing system 302. The cloud computing system 302 may include one or more elements 303-313, as described in more detail below. As further shown in FIG. 3, environment 300 may include the user device 105, the server device 110, and/or a network 320. Devices and/or elements of environment 300 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 110 includes one or more devices capable of receiving, generating, storing, processing, providing, and/or routing information, as described elsewhere herein. The server device 110 may include a communication device and/or a computing device. For example, the server device 110 may include a server, such as an application server, a client server, a web server, a database server, a host server, a proxy server, a virtual server (e.g., executing on computing hardware), or a server in a cloud computing system. In some implementations, the server device 110 includes computing hardware used in a cloud computing environment.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the testing system 115 may include one or more elements 303-313 of the cloud computing system 302, may execute within the cloud computing system 302, and/or may be hosted within the cloud computing system 302, in some implementations, the testing system 115 may not be cloud-based (e.g., may be implemented outside of a cloud computing system) or may be partially cloud-based. For example, the testing system 115 may include one or more devices that are not part of the cloud computing system 302, such as device 400 of FIG. 4, which may include a standalone server or another type of computing device. The testing system 115 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
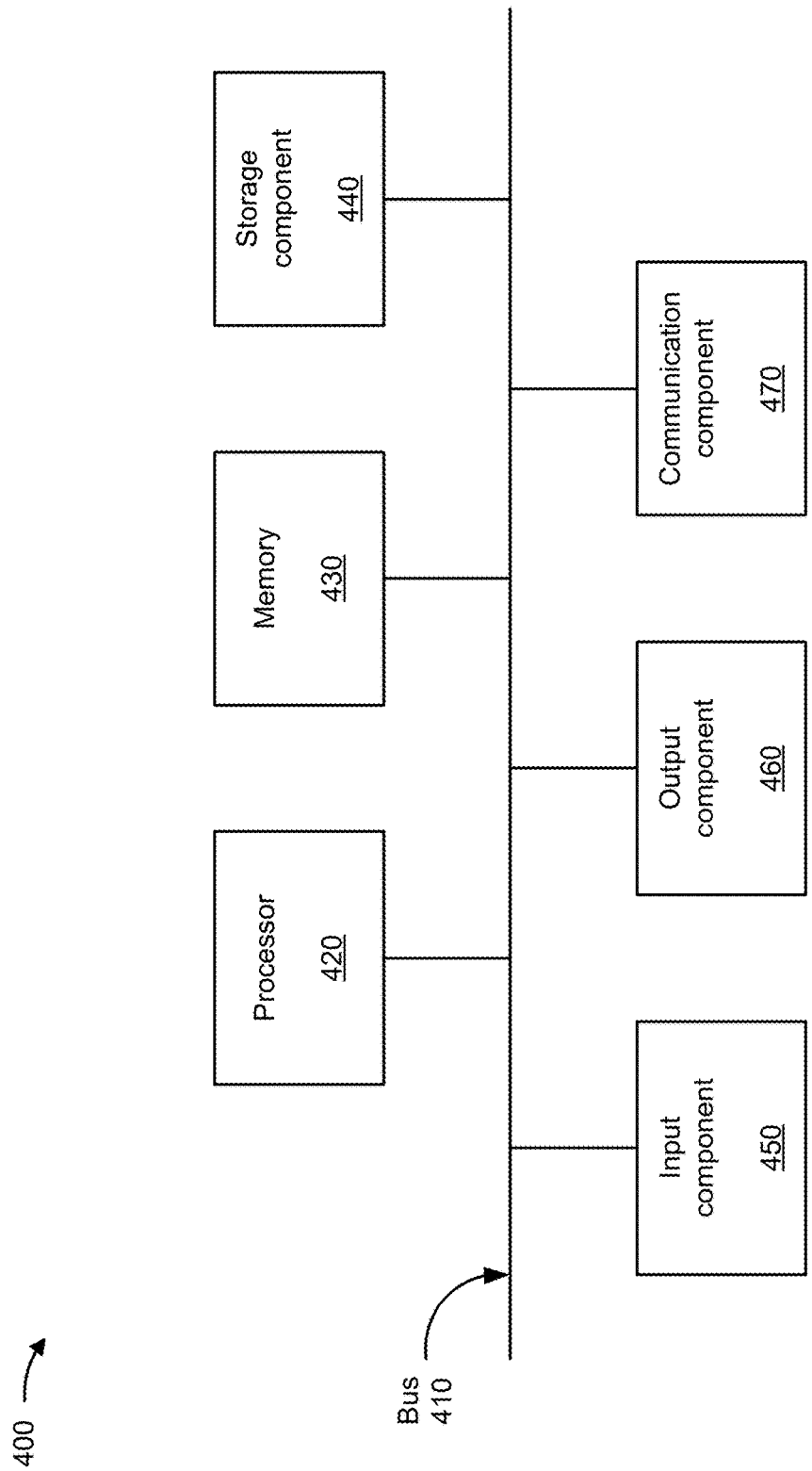
FIG. 4 is a diagram of example components of one or more devices of FIG. 3.

FIG. 4 is a diagram of example components of a device 400, which may correspond to user device 105, server device 110, and/or testing system 115. In some implementations, user device 105, server device 110, and/or testing system 115 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables the device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables the device 400 to provide output, such as via a display, a speaker, and/or one or more light-emitting diodes. The communication component 470 enables the device 400 to communicate with other devices, such as via a wired connection and/or a wireless connection. For example, the communication component 470 may include a receiver, a transmitter, a transceiver, a modem, a network interface card, and/or an antenna.

The device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with generating and executing a test case plan for a software product. In some implementations, one or more process blocks of FIG. 5 may be performed by a device (e.g., the testing system 115). In some implementations, one or more process blocks of FIG. 5 may be performed by another device or a group of devices separate from or including the device, such as a user device (e.g., the user device 105) and/or a server device (e.g., the server device 110). Additionally, or alternatively, one or more process blocks of FIG. 5 may be performed by one or more components of device 400, such as the processor 420, the memory 430, the storage component 440, the input component 450, the output component 460, and/or the communication component 470.

As shown in FIG. 5, process 500 may include receiving a selection of a software product and test input data (block 510). For example, the device may receive a selection of a software product and test input data identifying inputs of a test case for the software product, as described above. In some implementations, the device may provide a chat interface to a user device. The device may conduct a chat with a user of the user device via the chat interface and may receive the selection of the software product and the test input data based on conducting the chat with the user of the user device.

As further shown in FIG. 5, process 500 may include receiving the software product (block 520). For example, the device may receive the software product based on the selection of the software product, as described above.

As further shown in FIG. 5, process 500 may include generating test data for the test case (block 530). For example, the device may generate test data for the test case based on the test input data and the software product, as described above. In some implementations, the device may provide the test input data and the software product to an API development platform. The device may receive the test data for the test case from the API development platform. Alternatively, and/or additionally, the device may analyze a test case flow, identified in the test input data, for the test case and may generate the test data for the test case based on analyzing the test case flow.

As further shown in FIG. 5, process 500 may include generating a test case plan that includes the test data and test steps (block 540). For example, the device may process the test data and the software product, with a machine learning model, to generate a test case plan that includes the test data and test steps, as described above. The machine learning model may include a test case model associated with a test management tool.

As further shown in FIG. 5, process 500 may include generating test scripts for the test case plan (block 550). For example, the device may generate test scripts for the test case plan based on the software product, as described above. The device may generate the test scripts to be executable by an end-to-end testing framework and/or a behavior-driven development testing framework.

In some implementations, the device may provide the test case plan for display to a user device. The device may receive, from the user device, information indicating approval of the test case plan prior to generating the test scripts for the test case plan.

As further shown in FIG. 5, process 500 may include causing the software product to execute the test scripts to generate test results (block 560). For example, the device may automatically cause the software product to execute the test scripts to generate test results, as described above. In some implementations, the device may cause the software product to execute the test scripts, via an end-to-end testing framework and a behavior-driven development testing framework, to generate the test results. Alternatively, and/or additionally, the device may cause the software product to execute the test scripts locally or remotely to generate the test results.

As further shown in FIG. 5, process 500 may include performing one or more actions based on the test results (block 570). For example, the device may perform one or more actions based on the test results, as described above, such as generating a notification based on the test results, providing information about the test results for display, and/or retraining the machine learning model based on the test results.

Alternatively, and/or additionally, the device may remove a portion of the software product based on the test results, generate a new portion for the software product based on the test results, and replace the portion of the software product with the new portion. In some implementations, the device may determine a correction to the software product based on the test results and may implement the correction to the software product. For example, the device may modify the software product based on the test results and to generate a modified software product, and may re-test the modified software product.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, a selection of a software product and test input data identifying inputs of a test case for the software product;
    receiving, by the device, the software product based on the selection of the software product;
    generating, by the device, test data for the test case based on the test input data and the software product,
        wherein the test data includes information to be used to test the software product;
    processing, by the device, the test data and the software product, with a machine learning model, to generate a test case plan that includes the test data and test steps,
        wherein the machine learning model is trained based on historical test data to output test case plans that include the historical test data and steps corresponding to the historical test data;
    generating, by the device, test scripts for the test case plan based on the software product;
    causing, automatically by the device, the software product to execute the test scripts to generate test results; and
    performing, by the device, one or more actions based on the test results.

2. The method of claim 1, wherein generating the test data for the test case comprises:
    determining a functionality associated with the software product;
    generating a test case flow based on the functionality associated with the software product; and
    generating the test data for the test case based on the test case flow.

3. The method of claim 1, wherein performing the one or more actions comprises:
   removing a portion of the software product based on the test results;
   generating a new portion for the software product based on the test results; and
   replacing the portion of the software product with the new portion.

4. The method of claim 1, wherein performing the one or more actions comprises:
   determining a correction to the software product based on the test results; and
   implementing the correction to the software product.

5. The method of claim 1, wherein performing the one or more actions comprises:
   modifying the software product based on the test results and to generate a modified software product; and
   retesting the modified software product.

6. The method of claim 1, wherein receiving the selection of the software product and the test input data identifying the inputs of the test case for the software product comprises:
   providing a chat interface to a user device;
   conducting a chat with a user of the user device via the chat interface; and
   receiving the selection of the software product and the test input data based on conducting the chat with the user of the user device.

7. The method of claim 1, wherein generating the test data for the test case based on the test input data and the software product comprises:
   providing the test input data and the software product to an application programming interface development platform; and
   receiving the test data for the test case from the application programming interface development platform.

8. A device, comprising:
   one or more processors configured to:
      receive a selection of a software product and test input data identifying inputs of a test case for the software product;
      receive the software product based on the selection of the software product;
      provide the test input data and the software product to an application programming interface development platform;
      receive test data for the test case from the application programming interface development platform,
         wherein the test data includes information to be used to test the software product;
      process the test data and the software product, with a machine learning model, to generate a test case plan that includes the test data and test steps,
         wherein the machine learning model is trained based on historical test data to output test case plans that include the historical test data and steps corresponding to the historical test data;
      generate test scripts for the test case plan based on the software product;
      cause, automatically, the software product to execute the test scripts to generate test results; and
      perform one or more actions based on the test results.

9. The device of claim 8, wherein the machine learning model includes a test case model associated with a test management tool.

10. The device of claim 8, wherein the one or more processors, to generate the test scripts for the test case plan based on the software product, are configured to:
   generate the test scripts to be executable by an end-to-end testing framework and a behavior-driven development testing framework.

11. The device of claim 8, wherein the one or more processors, to cause the software product to execute the test scripts to generate the test results, are configured to:
   cause the software product to execute the test scripts, via an end-to-end testing framework and a behavior-driven development testing framework, to generate the test results.

12. The device of claim 8, wherein the one or more processors are further configured to:
   provide the test case plan for display to a user device; and
   receive, from the user device, information indicating approval of the test case plan prior to generating the test scripts for the test case plan.

13. The device of claim 8, wherein the one or more processors, to cause the software product to execute the test scripts to generate the test results, are configured to:
   cause the software product to execute the test scripts, locally or remotely, to generate the test results.

14. The device of claim 8, wherein the one or more processors, to generate the test data for the test case based on the test input data and the software product, are configured to:
   analyze a test case flow, identified in the test input data, for the test case; and
   generate the test data for the test case based on analyzing the test case flow.

15. A non-transitory computer-readable medium storing a set of instructions, the set of instructions comprising:
   one or more instructions that, when executed by one or more processors of a device, cause the device to:
      receive a selection of a software product and test input data identifying inputs of a test case for the software product;
      receive the software product based on the selection of the software product;
      generate test data for the test case based on the test input data and the software product,
         wherein the test data includes information to be used to test the software product;
      process the test data and the software product, with a machine learning model, to generate a test case plan that includes the test data and test steps,
         wherein the machine learning model is trained based on historical test data to output test case plans that include the historical test data and steps corresponding to the historical test data;
      generate test scripts for the test case plan based on the software product,
         wherein the test scripts are to be executable by an end-to-end testing framework and a behavior-driven development testing framework;
      cause, automatically, the software product to execute the test scripts, via the end-to-end testing framework and the behavior-driven development testing framework, to generate test results; and
      perform one or more actions based on the test results.

16. The non-transitory computer-readable medium of claim 15, wherein the one or more instructions, that cause the device to perform the one or more actions, cause the device to one or more of:
   generate a notification based on the test results;
   provide information about the test results for display;
   retrain the machine learning model based on the test results;

remove and replace a portion of the software product based on the test results;

determine and implement a correction to the software product based on the test results; or modify the software product based on the test results.

17. The non-transitory computer-readable medium of claim 15, wherein the one or more instructions, that cause the device to receive the selection of the software product and the test input data identifying the inputs of the test case for the software product, cause the device to:

provide a chat interface to a user device;

conduct a chat with a user of the user device via the chat interface; and receive the selection of the software product and the test input data based on conducting the chat with the user of the user device.

18. The non-transitory computer-readable medium of claim 15, wherein the one or more instructions, that cause the device to generate the test data for the test case based on the test input data and the software product, cause the device to:

provide the test input data and the software product to an application programming interface development platform; and receive the test data for the test case from the application programming interface development platform.

19. The non-transitory computer-readable medium of claim 15, wherein the one or more instructions further cause the device to:

provide the test case plan for display to a user device; and receive, from the user device, information indicating approval of the test case plan prior to generating the test scripts for the test case plan.

20. The non-transitory computer-readable medium of claim 15, wherein the one or more instructions, that cause the device to generate the test data for the test case based on the test input data and the software product, cause the device to:

analyze a test case flow, identified in the test input data, for the test case; and generate the test data for the test case based on analyzing the test case flow.

\* \* \* \* \*